United States Patent [19]

Pusch

[11] 3,904,661
[45] Sept. 9, 1975

[54] SURFACE ACTIVE MEANS, THEIR MANUFACTURE AND USE

[75] Inventor: Günter Pusch, Leitershofen, Germany

[73] Assignee: Chemische Fabrik Pfersee G.m.b.H., Augsburg, Germany

[22] Filed: Dec. 26, 1972

[21] Appl. No.: 318,038

[30] Foreign Application Priority Data
Dec. 28, 1971  Germany.............................. 2165018
Aug. 25, 1972  Germany.............................. 2241845

[52] U.S. Cl......... 260/404.5; 117/139.5 F; 252/357
[51] Int. Cl.²...................................... C07C 103/00
[58] Field of Search................................ 260/404.5

[56] References Cited
UNITED STATES PATENTS

| | | | |
|---|---|---|---|
| 2,085,706 | 6/1937 | Schoeller et al. | 260/404.5 X |
| 2,262,358 | 11/1941 | Groote et al. | 260/404.5 X |
| 2,609,931 | 9/1952 | Rodman | 260/404.5 X |
| 3,001,996 | 9/1961 | Mannheimer et al. | 260/404.5 X |

*Primary Examiner*—Ethel G. Love
*Attorney, Agent, or Firm*—V. Alexander Scher

[57] ABSTRACT

Surface active means contain compounds of the general formula

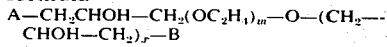

(I)

wherein

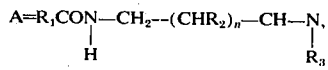

$x = 0$ or 1, H R$_3$

B at $x = 0$ is —H and at $x = 1$—A,—(OC$_2$H$_4$)$_p$—OH,—O—CH$_2$—(CHR$_5$—)$_q$—CHR$_4$—OH, —OR$_6$ or —OH, R$_1$ = saturated or singly unsaturated alkyl residue, which can also contain a hydroxyl group, with 9 to 17 C atoms, R$_2$ at $x = 0$ is —H and at $x = 1$,—H or —OH, R$_3$ = low possibly branched alkyl residue with 1 to 4 C atoms, —CH$_2$CH$_2$OH$_1$,—CH$_2$—CH(OH)—CH$_3$, —CH$_2$CH$_2$O—CH$_2$CHOH—CH$_2$—(OC$_2$H$_4$)$_m$OH or
—CH$_2$—CH—[O—CH$_2$—CHOH—CH$_2$—(OC$_2$H$_4$)$_m$OH]—CH$_3$, R$_4$ = —H or —CH$_3$, R$_5$ = —H or —OH, R$_6$ = low possibly branched alkyl residue with 1 to 4 C atoms, m at $x = 0$ to 6 30 or 4 to 16 as long as R$_3$ =
—CH$_2$CH$_2$O—CH$_2$CHOH—CH$_2$—(OC$_2$H$_4$)$_m$OH or
—CH$_2$—CH—[O—CH$_2$—CHOH—CH$_2$—(OC$_2$H$_4$)$_m$—OH] —CH$_3$,
and $m$ when $x = 1$ is 4 to 30, $n = 0$ or 1; $p = 2$ to 14, with the limitation that the sum $m = p \leq 32$ and $q = 0$ or 1, whereby the compounds of the formula (I) are set to a pH value of 3 to 10 by additions of bases or acids.

5 Claims, No Drawings

SURFACE ACTIVE MEANS, THEIR MANUFACTURE AND USE

This invention relates to new surface active means, their manufacture and use. The expression "means" is used in the sense of "agents".

Fatty acid amides substituted by polyglycol ether residues are known. They serve, for example, as wetting means, emulsifiers, softeners and the like. They have the drawback that they retain their strongly wetting properties even after heating to high temperatures due to the polyglycol residues contained therein, which is often undesirable. If, for example, hydrophobic properties should be imparted to fibrous materials which contain only small amounts of such fatty acid amides, then these fatty acid amides substantially diminish the desired effect.

An object of the present invention is to avoid these drawbacks.

Other objects will become apparent in the course of the following specification.

The present invention is based on the surprising discovery that fatty acid amide derivates of specific structure containing polyglycol ether residues do not have these detrimental properties.

The surface active means of the present invention contains compounds of the general formula $$A-CH_2-CHOH-CH_2-(OC_2H_4)_m-O-(CH_2-CHOH-CH_2)_x-B$$

(I)

which are set to a pH value of 3 to 10 by the addition of bases or preferably acids. In the formula (I) signify:

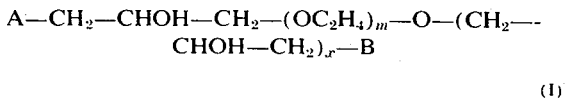

$x = 0$ or 1, B at $x = 0$ is -H and at $x = 1$ is —A, —($OC_2H_4$)$_p$—OH, —O—$CH_2$—($CHR_5$)$_q$—$CHR_4$—OH,—$OR_6$ or —OH $R_1$ = saturated or singly unsaturated alkyl residue which can also contain a hydroxyl group with 9 to 17 C atoms $R_2$ at $x = 0$ is —H and at $x = 1$ is —H or —OH $R_3$ = low possibly branched alkyl residue with 1 to 4 C atoms, —$CH_2CH_2OH$, —$CH_2$—$CH(OH)$—$CH_3$, —$CH_2CH_2O$—$CH_2$—$CHOH$—$CH_2$—($OC_2H_4$)$_m$OH, or —$CH_2CH$— O—$CH_2$—[$CHOH$—$CH_2$—($OC_2H_4$)$_m$OH]—$CH_3$ $R_4$ = —H or —$CH_3$ $R_5$ = —H or —OH $R_6$ = low possibly branched alkyl residue with 1 to 4 C atoms $m$ at $x = 0$ is 5 to 30 or 4 to 16 as long as $R_3$ = —$CH_2CH_2O$—$CH_2$—$CHOH$—$CH_2$—($OC_2H_4$)$_m$OH or —$CH_2$—$CH$—[O—$CH_2$—$CHOH$—$CH_2$($OC_2H_4$)$_m$OH]—$CH_3$ and $m$ at $x = 1$ is 4 to 30

$n = 0$ or 1; $p = 2$ to 14, with the limitation that the sum $m+p \leq 32$, and $q = 0$ or 1.

Preferred are generally the surface active means containing compounds wherein $n = 0$ and $m = 6$ to 14. Of compounds wherein $x = 0$ are particularly suitable such wherein $R_3$ = —$CH_2CH_2$—O—$CH_2$—$CHOH$—$CH_2$—($OC_2H_4$)$_m$OH.

Of compounds wherein $x = 1$ are particularly suitable those in which $R_2$ = —H and $R_3$ = $CH_2CH_2OH$ or —$CH_2CH_2$—O—$CH_2CHOH$—$CH_2$—($OC_2H_4$)$_m$OH.

Particularly preferred are the surface active means containing compounds wherein B = —($OC_2H_4$)$_p$—OH or —O—$CH_2$—($CHR_5$)q —$CHR_4$—OH. Of the last mentioned compounds are again particularly suitable those wherein at $q$ 1, $R_5$ = —OH and $R_4$ = —H, and at $q = 0$ also $R_4$ = —H.

Due to their unexpected properties, namely, that these compounds have no detrimental effects upon substrata treated subsequently with hydrophobically acting means, the surface active means of the present invention are suitable as preliminary cleaning means and peliminary washing means for substrata which will thereafter be treated with hydrophobically acting means of all types. However, it is also possible to use the means of the present invention in emulsions which contain hydrophobically acting substances, as wetting and/or emulsifying means and/or stabilizing means and/or softeners, without affecting the hydrophobic properties of substrata treated with these emulsions. Similarly the means of the present invention can be used as emulsifiers for such substances which are added to hydrophobing means also without influencing the hydrophobing properties.

As substrata are meant those of fibrous structure, particularly textiles of all types in the form of fabrics, textures and fleeces.

The surface active means of the present invention which contain compounds of the general formula (I) can be produced in a known manner by reacting fatty acid amides of the formulas A-H in the presence of acid binding means with chlorhydrinethers of polyethyleneglycols. There are the following possibilities:

I

Reaction of fatty acid amides of the formulas A–H with chlorhydrinethers ("chlorhydrinether C") which were produced by reacting 1 mol polyglycol of the formula H($OC_2H_4$)$_m$ OH with 1 to 1.4 mols epichlorhydrin in mol ratio of 1:1 in the presence of acid binding means. Thereupon it was set to the desired pH value of 3 to 10 by the addition of bases or preferably acids.

As long as $R_3$ means the residue 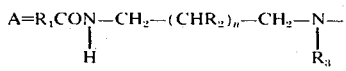 (OH)$CH_3$ or particularly —$CH_2CH_2OH$, the compounds of the formulas A-H can be reacted with the above-mentioned chlorhydrinethers C'' in the presence of acid binding means also in mol ratio 1:1 to 1:2, preferably 1:1.5 to 1:2 (fatty acid amide to chlorhydrinether C), whereby after the setting of the desired pH value surface active means are produced containing compounds wherein $R_3$ means the residue —$CH_2CH_2$—O—$CH_2$—$CHOH$—$CH_2$—($OC_2H_4$)—OH, or —$CH_2$—$CH$[O—$CH_2$—$CHOH$—$CH_2$—($OC_2H_4$)$_m$OH]—$CH_3$ With the preferred reaction ratio products are produced which when used as emulsifiers make the obtained emulsions even less sensitive to the addition of metal salts.

II

Reaction of fatty acid amides A–H with bischlorhydrinether ("bischlorhydrinether D") of the general formula $$ClCH_2—CHOH—CH_2(OC_2H_4)_m—CH_2—CHOH—CH_2Cl$$

in mol ratio 1:1 and further reaction of the produced intermediate products containing a chlorhydrin group with compounds of the formulas B–H in mol ratio 1:1, also in the presence of acid binding means. Then it is again set to the desired pH value of 3 to 10 by the addition of bases or preferably acids. The progress of the reaction is indicated by the following scheme:

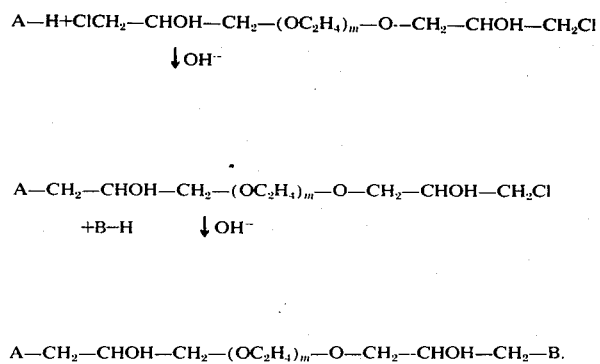

In case B = A the fatty acid amides can be reacted with bischlorhydrinethers in one stage in mol ratio 2:1 under the above indicated conditions, whereby then correspondingly at least 2 mol of acid binding substance must be added. Finally they are set to the desired pH value.

As long as $R_3 = —CH_2—CHOH—CH_3$ or particularly $—CH_2CH_2—OH$, a further reaction with chlorohydrinethers C can take place. If such a residue is present only once (B ≠ A), then the reaction of these surface active means with the monochlorohydrin ethers* in mol ratio 1:1 to 1:2 can always take place in the presence of acid binding means (limitation sum $m + p = 32$).

*can take place in the mol ratio 1:1. If such a residue is present twice, which may be possible, if B = A, then the reaction of these surface active means with the monochlorohydrin ethers Finally the desired pH value is always set.

All described reactions take place in substance, in solution, preferably in concentrated aqueous solution while heating in the presence of acid binding means whereby soda lye or potash lye are particularly suitable. The acid binding means should be used in slight surplus to make certain that the chlorhydrin groups will be extensively reacted. If this is not the case then there is the possibility that HCl will be split off under various use requirements, which can lead to disturbances.

As initial compounds of the formulas A–H serve fatty acid amides having the formula

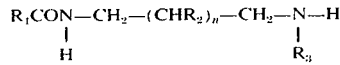

By way of example, they can be produced in a known manner by condensation of fatty acids $R_1COOH$ with amines having the formula

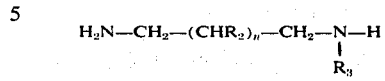

$R_1$ and $n$ like aforementioned; $R_3$ of course only $C_{1-4}$ alkyl residues or $—CH_2—CH_2—OH$ or $—CH_2—CH(OH)—CH_3$.

As fatty acids serving as a base for the fatty acid amides come into consideration according to the above given definition of $R_1$ for example, lauric acid, palmitic acid, stearic acid, oleic acid and/or ricinoleic acid, which can be also provided in the form of technical mixtures. As amines constituting a base for the fatty acid amides according to the above stated definitions for $R_2$, $R_3$ and $n$ the following can be named for example: N-methylethylenediamine, N-ethylethylenediamine, N-ethyl-propylene-diamine-(1,3), (N-β-hydroxypropyl)-ethylene-diamine, (N-β-hydroxyethyl)-1,3-diamino-propanol-(2), (N-β-hydroxyethyl)-propylenediamine-(1,3) and particularly (N-β-hydroxyethyl)-ethylenediamine. In general amines are preferred wherein $R_2 = H$ resp. $n = 0$ and $R_3 = —CH_2CH_2OH$, namely amines which are derived from ethylene-diamine or 1,3 propylenediamine.

Chlorohydrin ethers required as the second reaction component are derived from polyethylene glycols having the formula $H(OCH_2CH_2)_mOH$, wherein m has the given meaning. Polyethylene glycols constituting a base for these chlorohydrin ethers have correspondingly a mol weight of about 200 to about 1350. The above-mentioned chlorohydrin ethers are available in the usual manner, for example, by reaction of polyethylene glycols with epichlorohydrin.

If $x = 0$ there is the limitation that $m = 6 - 30$ or $4 - 16$, as long as $R_3 = —CH_2CH_2—O—CH_2—CHOH—CH—_{(OC_2H_4)_m}OH$ or $—CH_2—CH—[O—CH_2—CHOH—CH_2—(OC_2H_4)_mOH]—CH_3$, since if these values are exceeded the advantages of the surface active means of the present invention are not provided any more in increased manner.

In case $x = 1$ the compounds of the formulas B–H can be equal to A–H. This has been indicated. As further components B–H can serve polyethylene glycols having the formula $H—(OC_2H_4)_p—OH$, wherein $p$ can be 2 to 14. However, for the abovestated reasons there is the limitation that the sum $m + p$ must be equal or smaller than 32.

As compounds of the types B–H are also suitable compounds having the formula $H—O—CH_2—(CHR_5)_q—CHR_4—OH$, whereby $R_4$, $R_5$ and $q$ have the above-stated meaning. Compounds which fall within this definition are, for example, 1,2-propylene glycol, 1,3-propylene glycol, 1,3-butylene glycol, glycerin and particularly ethylene glycol.

As further components for the compounds B–H can be considered monovalent alcohols of the formula $H—OR_6$. This includes, for example, butanol, n- or isopropanol and particularly methyl alcohol and ethyl alcohol.

Finally it is also possible to use for B–H directly HOH, whereby through the addition of acid binding means in aqueous solution the produced chlor is saponified, so that surface active means are produced having the formula

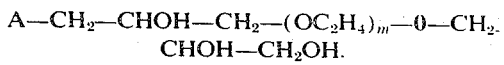
A—CH$_2$—CHOH—CH$_2$—(OC$_2$H$_4$)$_m$—O—CH$_2$—CHOH—CH$_2$OH.

After the reaction is completed, which can be best determined by the iogenic available chlor, the desired pH value is set by the addition of bases or preferably acids. If the acid binding means are used in slight excess, then if the end product is to react alkaline, the correction of pH value can be dispensed with under certain conditions. This is particularly the case when the surface active means of the present invention are to be inserted as preliminary cleaning means or emulsifying means for polyethylene.

However, mostly is desired a weak alkaline, neutral or weak acid adjustment of the surface active means to a pH value of 3 to 8, particularly 5 to 7, since water repelling means are mostly provided with a weak acid emulsion. As acids for setting this pH value are suitable mineral acids as well as organic acids.

For example, can be named:

Hydrochloric acid, sulfuric acid and nitric acid, as well as acetic acid, glycolic acid and oleic acid. Since the reaction product usually has a pH value of over 8, caused by the small excess of acid binding means, it is also necessary, if the final product shoud react only weakly alkaline, to add in such case one of the mentioned acids.

The products have a more or less viscose to wax-like consistency, depending upon the used initial materials. For better handling it is desirable prior to the setting of the desired pH value to dilute the obtained product with water.

The surface active means of the present invention serve, -as has been summarily indicated,- as preliminary cleaning means and preliminary washing means for substrata, which thereupon are to be treated with hydrophobingly acting means of all types. They find use particularly in the textile industry where often fabrics consisting of fibers, woven goods or fleeces must be made water repellent. These textiles prior to their treatment for water repellency must be carefully freed by washing from preparations and auxiliary means pertaining to preliminary treating stages, such as treatments with lubricants, spooling oils, sizing agents or mercerizing auxiliary means, desizing agents or dyeing auxiliary means. The wetting-out and washing means usually used for this washing process often strongly adhere to the textiles and influence the hydrophobic effects desired by a following water repellent treatment.

By the use of surface active means of the present invention in such a washing process in the usual concentration of 0.5 to 5 g/l. the detrimental influence upon the hydrophobic properties is substantially eliminated.

A further use of the surface active means of the present invention consists in their insertion into the treating baths used for the hydrophobing. By the addition of these means acting as wetting-out agents a quick penetration of the textile fabric is provided which is important for the usual foularding process, particularly if it is carried out with high running speed, since no uniform penetration is provided by single immersion and single squeezing. Since the treating baths which contain hydrophobingly acting substances in emulsion form, often have comparatively long wetting times for the penetration of the fabric being treated, it is often necessary in such cases to carry out the foularding in such manner that there is an immersion, a squeezing, another immersion and another squeezing so as to provide a complete uniform penetration into the fabric. By the additional use of the means of the present invention in the treating baths the second immersion and the second squeezing can be eliminated or the foularding can be carried out with greater speed. Contrary to other known wetting means the water-repellent effect of these baths is not negatively influenced by the means of the present invention in the usual amounts of 0.5 to 4 g/l. The means of the present invention can be then added to the impregnation bath. However, it is obviously also possible to add these means in advance to the generally used concentrated hydrophobing means.

The wetting means of the present invention due to their extensively non-iogenic character are substantially compatible with all hydrophobing means used in the textile industry. As such means can be named in addition to hydrophobing means with a base of wax or paraffin, those having the base of fat modified melamine resins, the base of organopolysiloxanes and others, including those having the base of compounds which contain fluor organic residues and by means of which oil repelling properties can be attained at the same time. Furthermore, there are often used hydrophobing means combined with crease-proofing means. In such cases the addition of the means of the present invention is also advantageous.

Since the surface active means of the present invention have also emulsifying properties they can be used by themselves or in combination with other usual emulsifier for emulsifying water repellent substances, such as paraffin, silicons and the like. The emulsifying then takes place in a known manner, for example, by applying the surface active means of the present invention serving as the emulsifier, centrifuging the hydrophobic acting substances in molten or dissolved form, possibly followed by a high pressure homogenizing.

In addition, the surface active substances of the present invention, possibly along with other usual emulsifiers, can be used for emulsifying substances which are added to hydrophobing means, for example, as softeners. As such substances can be named, for example, fatty acid esters or fatty acid amides, as well as polyethylene waxes. In this case also the emulsifying takes place in the usual manner.

The following examples are given by way of exemplification only.

EXAMPLE 1

A glass flask with 3 necks and provided with a stirrer and a thermometer receives 368 g. (1 mol) of an oleic acid amide of the formula

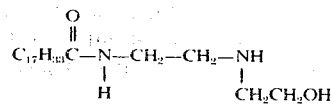

and 1380 gr. of a chlorohydrin ether produced by reacting polyglycol 600 and epichlorohydrin in a mol ratio 1:1. The mixture is heated while stirring to about 95°C. Then slowly are added 2 mol KOH in the form of a 45% aqueous solution and the mixture is heated to boiling temperature (about 115°C). It is kept for about 30 minutes at 115°C to 120°C while water is evaporated. Then the flask is cooled to about 70°C and then 800 gr. water are added and well stirred in for 15 minutes. Finally the pH value is set to 6.8 by the addition of a small amount of 20% muriatic acid. A yellow very viscose product is produced which contains about 60% by weight of the effective substance. The product thus produced is suitable as wetting agent and emulsifier.

An equally good product is produced if instead of the above mentioned oleic acid amide 1 mol of a product is used which is produced by condensation of 1 mol oleic acid with 1 mol β-hydroxyethyl-1,3 propylendiamine.

The following comparative experiment was actually carried out to indicate the surprising technical advantage of the surface active means of the present invention:

to one liter of a treating bath containing
15 g/l. dimethylolethylene urea
10 g/l. tetramethyl ether of hexamethylolmelamine
2 ml/l. acetic acid (60%)
2 ml/l. zinc nitrate-hexahydrate
120 g/l. of a polysiloxane emulsion produced according to example 2 of German Patent Specification No. 1,444,551, were once added 3 g/l. of an about 60% product made in accordance with this example to produce bath A. Bath B was produced by the addition of 3 g/l. of a usual wetting agent with a fatty acid amide base (accumulation product of oleic acid amide and ethylene oxide in mol ratio 1:12) also having an amount of about 60%. Bath C was used in the comparative experiment without the addition of wetting means.

A cotton-polyester (30:70) jacket-poplin (weight per m² 180 gr.) was foularded with the above baths, namely soaked and squeezed, and after drying and condensation (5 minutes 150°C) it shows the following sprinkling effects, determined according to German norm DIN 53 888:

| Treated with | % water reception | water-repellent effect |
|---|---|---|
| Bath A | 8.2 | 4-4-4 |
| Bath B | 19.6 | 3-2-1 |
| Bath C | 6.7 | 4-4-4 |

It is apparent from the above that treatment with bath A has a substantial advantage as compared to treatment with bath B. The bath without the addition of wetting means (bath C) has the technical drawback that the wetting treatment of the cottonpolyester fabric takes place more slowly, so that in foularding to provide uniform complete soaking it is necessary to immerse it twice and to squeeze it twice, or to keep it immersed for a longer time period which requires slower fabric speeds.

This product is also particularly effective for making a polyethylene emulsion which does not influence the water repellent effect according to the following example:

A container provided with a heating jacket and a quick stirrer is filled with 634 gr. distilled water and heated to about 93°C. Separately by stirring and heating a fused mass is produced from 72 gr. of the above emulsifier of the present invention, 4.5 gr. of 45 to 47% aqueous potash lye and 160 gr. of a polyethylene wax with a molecular weight of about 1500 and an acid number of about 28, saponification number of about 50 and a dropforming temperature of 97°C. It is introduced at a temperature of 120°C into the provided water heated to about 93°C and is centrifuged by the quick stirrer. The emulsion thus produced is held for another 15 minutes at boiling point while being centrifuged and is then cooled to about 30°C. (Emulsion A).

For comparison purposes a polyethylene emulsion is produced in the same manner by using the same amount (calculated as active substance) of an ethoxylated nonyl phenol, containing in average 9 mol ethylene oxide per mol nonyl phenol, instead of the means of the pesent invention (emulsion B).

In both cases stable emulsions are produced stabilized with respect to metal salts.

From each of the emulsions A and B 30 g/l. were introduced into the bath C of this example while correspondingly diminishing the amount of water so that the entire bath has the volume of 1 liter.

These baths were used to treat the cotton-polyester poplin described in this example in the manner described therein (treatment A and treatment B). The sprinkling effect according to German norm DIN 53 888 is as follows:

| | % water reception | water-repellent effect |
|---|---|---|
| treatment A | 6.7 | 4-4-4 |
| treatment B | 20.1 | 3-1-1 |

EXAMPLE 2:

An emulsifier is produced according to Example 1, but with the sole difference that instead of the used oleic acid amide there is introduced 1 mol of the corresponding amide of ricinoleic acid. There results a light yellow-brown viscose clear product.

This product can be used as wetting or disperging means and it does not diminish in the inserted amounts usual for the wetting means 0.5 to 4 g/l. of the commercial products usually containing 50 to 60% effective substance, the water repellent or oil repellent effect. Specifically it can be also used as prewashing means for treating fabrics which thereupon receive a water-repellent treatment.

To show the superiority of surface active means of the present invention produced in accordance with this example the following comparative experiment was actually carried out:

A cotton-polyester poplin cut piece as in Example 1 was preliminarily cleaned once with 4 g/l. of a product produced in accordance with this Example and containing about 60% effective substance, for 20 minutes at 50°C. Then it was rinsed for 10 minutes under flowing water and finally after intermediate drying it was treated in the bath C described in Example 1 under conditions set forth therein (Experiment A). For the purpose of comparison a preliminary cleaning was carried out with 4 g/l. of an additive product of nonyl phenol and ethylene oxide in a 60% concentration (mol ratio about 1:9) and then it was treated in the same manner (Experiment B). The determination of the water repelling effect according to German norm DIN 53 888 produced the following table:

|  | % water reception | water-repellent effect |
| --- | --- | --- |
| Experiment A | 4.9 | 4-4-4 |
| Experiment B | 10.6 | 4-3-2 |

This also clearly shows the superiority of the surface active means of the present invention.

However, means produced in accordance with this Example can also be used, for example, as an emulsifier for producing a softener which can be added to baths producing water rejection in the usual amounts of 10 to 30 g/l., without having a negative effect upon the water rejecting properties. Such a softener can be produced, for example, as follows:

100 gr. of the product of the present invention are dissolved in 500 gr. of 90°C hot water. To this emulsifier solution are centrifuged as a thin ray 100 gr. stearic acid amide as a molten batch of about 100°C. The quick stirrer is allowed to run for about another 5 minutes and then it is cooled while continuing to be stirred intensively and while slowly adding 300 gr. water to close to room temperature.

The result is a pasty finely separated emulsion which imparts to the textiles a good soft surface smooth hand and which also has the above described special advantage.

EXAMPLE 3

286 gr. (1 mol) of lauric acid amide having the formula

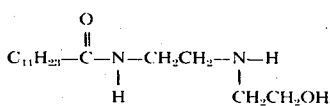

are mixed with 1.5 mol of a chlorohydrin ether produced by reacting 1 mol polyglycol 400 with 1.2 mol epichlorohydrin in a 2 liter reaction flask provided with a stirrer and a thermometer. The mixture is heated to about 90°C while stirring. To this mixture are slowly added about 1.8 mol KOH in the form of a 45% aqueous solution and then it is heated to boiling temperature (about 112°C). It is kept for about 30 minutes at a temperature of 110°C to 115°C. Thereupon the flask is cooled to about 85°C, 800 gr. water are added, the mixture is stirred for 20 minutes and is set to a pH value of 6.6 with a 60% acetic acid. The product thus obtained is particularly suitable as emulsifier and as wetting means. However, it is also suitable as cleaning means and if it remains upon the fabric and the fabric is then treated for water repellency it does not diminish the water repellent effect.

The above described amide can be effectively replaced by the condensation product of palmitinic acid and N-β-hydroxypropylethylenediamine in mol ratio 1:1.

EXAMPLE 4

414 gr. (1 mol) of ricinoleic acid amide of N-ethyl-1,3-propylenediamine are placed in an reaction flask provided with a stirrer and thermometer and 1 mol of a chlorohydrin ether (produced from 1 mol polyglycol 1000 and 1.25 mol epichlorohydrin) is added thereto, the mixture being heated to about 95°C while stirring.

To this mixture are slowly stirred in 1.35 mol NaOH in the form of a 45% aqueous solution and it is completed as described in Example 2. The obtained product is particularly suitable as wetting means and emulsifier.

This product can be used as emulsifier for producing extensively metal salt stable silicon emulsions, for example, according to the following recipe:

In a container provided with a quick stirrer and capable of being cooled are introduced 60 gr. of the emulsifier of the present invention, 3.5 gr. concentrated (36%) muriatic acid and 270 gr. water and then are centrifuged at 20°C 250 gr. of a hydrogenmethylpolysiloxane (viscosities at 20°C about 30 cSt.) which was dissolved in 30 gr. toluol.

After a centrifuging for about 15 minutes the produced emulsion is treated in a high pressure homogenizing machine while cooling under a pressure of 260 atu. for about 30 minutes. A finely divided stable emulsion is produced having a pH value of about 2.5 and with the addition of usual silicon catalysts having an excellent water repellent effect upon fibrous materials.

A well useable product is also produced if the above amide is exchanged for 340 gr. of stearic acid amide of N-methylethylene diamine.

EXAMPLE 5

286 gr. (1 mol) of the lauric acid amide indicated in Example 3 are mixed with 586 gr. (1 mol) of bis-chlorohydrin ether of polyglycol 400 in a 2 liter reaction flask provided with a stirrer and a thermometer. The mixture is heated to about 90°C while stirring. To this mixture are slowly added 1.1 mol KOH in the form of a 45% aqueous solution and it is then heated to boiling temperature (about 110°C). It is held at a temperature of 110°C to 115°C for about 30 minutes while a small amount of water is steamed off. Then are added 62 gr. (1 mol) ethylene glycol as well as another mol of KOH in the form of a 45% solution without intermediate cooling. Finally it is treated again for 30 minutes at boiling temperature (110°C to 115°C) and then cooled to about 70°C.

Analytical examination has shown that 96% of the organically bound chlor was changed to ionical one.

Finally 400 gr. water are added, there is a stirring for further 20 minutes with simultaneous cooling and a setting to a pH value of 6.6 by the addition of a small amount of 20% muriatic acid. There results a yellowish thinly paste-like product which contains the desired surface active means in a concentration of about 55 percent by weight. The product thus produced is suitable as wetting means and as emulsifier.

To illustrate the surprising technical advantages of the surface active means of the present invention the following comparative experiment was carried out in the manner similar to that of Example 1:

To 1 liter of a treating bath containing
- 15 g/l. dimethylolethylene urea,
- 10 g/l. tetramethyleter of hexamethylolmelamine,
- 2 ml/l. acetic acid (60%)
- 3.5 g/l. zinc nitrate-hexahydrate
- 120 g/l of a polysiloxane emulsion produced according to Example 2 of German Patent Specification No. 1,444,551 were added once 3 g/l. of an about 55% product produced according to this Example (bath A). Another time there were added 3 g/l. of usual wetting means with a fatty acid amide basis (addition product of lauric acid amide and ethylene oxide in mol ratio 1:9) also with a content of about 55% (bath B). Furthermore a bath without a wetting means addition was used in the comparative example (bath C).

A cotton-polyester (30:70) jacket poplin (weight 180 gr. per m²) which was foularded with above baths, namely, saturated and squeezed shows after drying and condensation (5 minutes 150°C) the following sprinkling produced according to the German norm 53 888:

| Treated with | % water reception | water-repellent effect |
|---|---|---|
| Bath A | 7.3 | 4-4-4 |
| Bath B | 18.5 | 3-2-1 |
| Bath C | 5.6 | 4-4-4 |

It is apparent from the above that the treatment with bath A has a substantial advantage over treatment with bath B. The drawbacks of bath C have been indicated in Example 1.

EXAMPLE 6

An emulsifier is produced in accordance with Example 5 with the difference that instead of the described lauric acid 1 mol of the corresponding amide of the oleic acid was used and with the further difference that in the second stage instead of ethylene glycol a polyethylene glycol with a molecular weight 300 was used. The result is a light yellow-brown viscose clear product.

This product can be used as wetting and disperging means and it does not diminish the water repellent and oil repellent effects in the inserted amounts usual for wetting means of 0.5 to 4 g/l. of the commercial products containing usually 50 to 60% effective substance. Above all it can be also used as preliminary washing means for cleaning textiles which are thereupon subjected to a water-repellent treatment.

To show the superiority of the surface active means of the present invention produced according to this Example a further comparative experiment was carried out:

A cotton-polyester-poplin is cut-out as in Example 1 was preliminarily cleaned in the manner described in Example 2 with 4 g/l. of the product produced in accordance with this Example and containing about 65% of effective substance, then it was rinsed and after intermediate drying was supplied to treating bath C described in Example 5 according to conditions set forth therein (Experiment A). For the purpose of comparison an addition product of nonyl phenol and ethylene oxide (mol ratio about 1:9) provided in a 65% concentration was preliminarily cleaned and then treated in the same manner. The determination of the water repellent effect according to German norm DIN 53 888 resulted in the following table:

| | % water reception | water repellent effect |
|---|---|---|
| Experiment A | 4.3% | 4-4-4 |
| Experiment B | 9.7% | 4-3-2 |

This also shows a clear superiority of the surface active means of the present invention.

EXAMPLE 7

A glass flask described in Example 1 receives 316 gr. (1 mol) of lauric acid having the formula

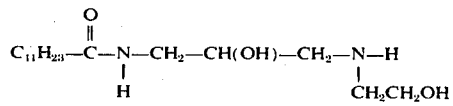

along with 593 gr. (½ mol) of bischlorohydrin ether of polyethylene glycol. The mixture is heated to about 90°C and to it are added while stirring within 5 minutes, 1,1 mol NaOH in the form of a 50% solution. The temperature then rises to 110°C, the reaction time is 40 minutes at a temperature of 115°C for 40 minutes, then it is cooled to 75°C, then 500 gr. water is added and it is set with 60% acetic acid to a pH of 6.5. The result is a transparent yellowishly colored viscose-liquid product which as addition to baths with impregnating means increases the wetting capacity without affecting the water repellent capacity to any substantial extent.

The analytic examination showed that 98.2% of the organically bound chlor introduced with the bischlorohydrin ether were reacted.

Means produced in accordance with this Example can be also used, however, for example, as an emulsifier for producing a softener which can be added to water repellent making baths in the usual amounts of 30 g/l. without having a negative influence upon the water repelling effect. Such a softener, as, for example, was indicated in Example 2, can be made from 100 gr. of the product of the present invention in hot water and 100 gr. stearic acid amide.

A pasty finely divided emulsion is also produced which provides to textiles a good soft surface smooth hand and which also has the above stated special advantage.

EXAMPLE 8

Into a glass flask provided with a stirrer and a thermometer were weighed in 368 gr. of the oleic acid amide used in Example 1 and 786 gr. (1 mol) of bischlorohydrin ether of polyglycol 600 while stirring. The mixture was heated to a temperature of 90°C and for 5 minutes 1 mol KOH in the form of a 45% aqueous solution was poured in. Then the mixture was heated to the boiling temperature (110°C to 115°C) and was stirred at that temperature for about 45 minutes. Thereupon were mixed in 76 gr. (1 mol) 1,2-propylene glycol and 1 mol KOH in the form of a 45% aqueous solution and they were allowed to react for 30 minutes at 110°C to 115°C until at least 93% of the organically bound chlor was reacted. Then it was cooled to about 70°C, 500 gr. water were mixed in and to clarify the product it was stirred for about 30 minutes. Finally 160 gr. oleic acid were added. There results a pH of about 7.5.

This product is particularly well suited for the making of a polyethylene emulsion which does not diminish the water repellent effect according to the procedure indicated in Example 1, with the only difference that here 72 gr. of the emulsifier produced according to this Example are used (emulsion A).

For the purpose of comparison a polyethylene emulsion is produced in the same manner as in Example 1 by the use of the same amount (calculated as active substance) of an ethoxylated nonyl phenol containing in the average 9 mol ethylene oxide per mol nonyl phenol instead of the means of the present invention (emulsion B).

In both cases stable metal salt steadfast emulsions are produced.

To the bath C described in Example 5 are added 30 g/l. of each of the emulsions A and B with correspondingly diminished water amount, so that the entire bath has a volume of one liter.

The cotton-polyester poplin described in Example 5 is treated with these baths in the manner described therein (treatment A and B).

The sprinkling examination according to German norm DIN 53 888 produces the following results:

|  | % water reception | water repellent effect |
|---|---|---|
| treatment A | 6.8 | 4-4-4 |
| treatment B | 20.5 | 3-1-1 |

EXAMPLE 9

414 gr. (1 mol) of a ricinoleic acid amide of N-ethyl-1,3-propylene diamine are supplied to a reaction flask and are mixed with 1536 gr. (1 mol) of a bischlorohydrin ether of polyglycol 1350, heated to 100°C and then receive while stirring 1 mol NaOH in the form of an about 50% aqueous solution. It is allowed to react for 1 hour at about 113°C and it receives 1 mol 1,3 butylene glycol as well as 1,1 mol Na OH in the form of a 50% aqueous solution. The mixture is stirred for another hour at 110°C and is then cooled to close to room temperature. The result is a lightly brown wax-like product in which the formed sodium chloride is suspended. When diluted with water the product has a pH value of 9.7. It is particularly suitable as preliminary washing means for fabrics which thereupon are to be treated for water repellency and as an emulsifier for polyethylenes in accordance with Example 8.

EXAMPLE 10

Dispersing means which substantially do not influence water and oil repellency are produced by combining a mixture of 920 gr. (2½ mol) of the oleic acid amide described in Example 6 and 925 gr. (2½ mol) of the corresponding stearic acid amide in a stirring flask with 1930 gr. of bischlorohydrin ether of polyethylene glycol 200. Into the homogenous mixture are introduced at 80°C 5 mol KOH as a 45% aqueous solution, the reaction heat is increased by subsequent heating to 115°C and is maintained at 15 minutes while stirring. Thereupon are added 3 kg (5 mol) polyglycol 600 and 5.2 mol KOH, whereupon the reaction is continued for further 45 minutes at 120°C. Finally the mixture is cooled, 5 liter water are well mixed into it, the pH is set for 6.5 with concentrated muriatic acid and then it is cooled to nearly room temperature. This product can be added in the amount of 1 to 4 g/l. to impregnation mean baths, for example, to a bath containing the usual zirconium salt paraffin emulsion for increasing the wetting capacity, for improving the hand and for diminishing the coatings upon the rollers. In all these cases an influence upon water repellent properties could not be located.

EXAMPLE 11

A product is produced according to Example 10 with the sole difference that in the second stage instead of 5 mol polyglycol 600 5 mol glycerin are used. This product is also characterized by its softening and disperging action without diminishing the water repellent and oil repellent effects.

EXAMPLE 12

By joint condensation of 1 mol oleic acid with 1 mol β-hydroxyethyl-1,3-propylene diamine under usual conditions an amide of technical quality is produced having the formula

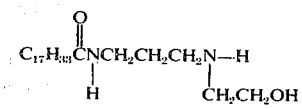

A reaction flask provided with a stirrer, a thermometer and a Liebig condenser receives 764 gr. (2 mol) of this amide molten with 986 gr. (1 mol) of bischlorohydrin ether of polyglycol 800 and at a temperature of 95°C there are introduced 2.1 mol KOH in the form of a 30% aqueous solution within 15 minutes. To complete reaction the mixture is heated to 110°C and kept at that temperature for 30 minutes. Then it is cooled to 90°C, 2 liter water are added and it is set to a pH of 6.0 with muriatic acid.

This product can be used as emulsifier for producing extensively metal salt permanent silicon emulsions according to conditions set forth in Example 4, with the sole difference that here 60 gr. of the emulsifier produced according to this Example are introduced.

There is also produced a finely divided stable emulsion having a pH of about 2.5 and which with the addition of usual silicon catalysts has an excellent water repellent effect upon fibrous materials.

EXAMPLE 13

356 gr. (1 mol) of the condensation product of palmitic acid and N-β-hydroxypropylethylene diamine in mol ratio 1:1 is reacted in heat with 1 mol bischlorohydrin ether of polyglycol 200 with the addition of 1 mol soda lye. Thereupon also with heat is added a reaction product containing a chlorohydrin group with 1 mol ethanol with the addition of 1.2 mol soda lye. During final reaction care is taken so that the organically bound chlor brough through the bischlorohydrin is changed to the extent of more than 97% to ionic chlor. For dissolving the produced sodium chlorate 600 gr. water are stirred into the bath and it is set to a 5.5 pH with 20% sulfuric acid.

EXAMPLE 14

A reaction flask provided with a stirrer and a thermometer receives 338 gr. (1 mol) of oleic acid amide of N-methyl-ethylene diamine jointly with 786 gr. (1 mol) of bischlorohydrin ether of polyglycol 600. The mixture is heated while stirring to 90°C and during 15 minutes 1 mol KOH in the form of a 45% aqueous solution is added, whereby the temperature rises to 95°C. The mixture is allowed to stay for 120 minutes at that temperature. Thereupon are added 4 liter water and 1.2 mol potash lye and a treatment continues for 90 minutes at a temperature of 90°C to saponify the remaining chlorohydrin groups. Finally the product is cooled to 30°C and is set to a pH of 7.5 with glycolic acid.

EXAMPLE 15

Into a stirring flask provided with a stirrer and a thermometer are introduced 368 gr. (1 mol) of the oleic acid amide mentioned in Example 1 and 786 gr. of bischlorohydrin ether of polyglycol 600. The mixture is heated to 90°C. Then 1 mol KOH in the form of a 45% aqueous solution is added and the mixture is heated to boiling temperature (about 120°C). The product is held for 20 minutes at 115°C to 120°C. Then are added 62 gr. ethylene glycol and a further mol KOH in the form of a 45% aqueous solution at a temperature of about 100°C. The product is held for 15 minutes at boiling temperature.

After cooling to about 90°C there are added 703 gr. of a chlorohydrin ether which was produced by reacting polyglycol 600 and epichlorohydrin in a mol ratio of 1:1 and at about 100°C also 1 mol KOH in the form of a 45% aqueous solution. After further 30 minutes at 115°C to 120°C it was cooled to 70°C, then 600 gr. $H_2O$ were added and stirred.

The product contains about 63% of effective substance and is suitable as wetting means and emulsifier.

EXAMPLE 16

To a 3-neck flask having a stirrer and a thermometer are introduced 736 gr. (2 mol) of the oleic acid amide mentioned in Example 1 and 786 gr. of bischlorohydrin ether of polyglycol 600 and are heated to 100°C. Then are added 2 mol KOH in the form of a 45% aqueous solution and the mixture is heated to boiling temperature (about 115°C). After stirring for 20 minutes at about 115°C to 120°C it is cooled to about 90°C.

Thereupon are added 703 gr. of a chlorohydrin ether which was produced by reacting polyglycol 600 and epichlorohydrin in mol ratio 1:1 and at about 95°C 1 mol KOH in the form of a 45% aqueous solution. After stirring for about 30 minutes at 115°C to 120°C the product was cooled to 70°C and 600 gr. $H_2O$ were added while stirring.

The product contains about 60% effective substance.

I claim:

1. Process for producing fatty acid amides containing polyglycol ether residues comprising reacting fatty acid amides of the general formula A—H, wherein A is n

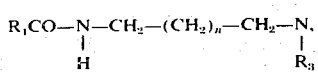

$R_1$ is a saturated or singly unsaturated alkyl residue which can also contain a hydroxyl group with 9 to 17 C-atoms, $R_3$ is a low alkyl residue with 1 to 4 carbon atoms, $-CH_2CH_2OH$, $-CH_2CH(OH)CH_3$ $n$ is 0 or 1 with chlorohydrin ethers C, said chlorohydrin ethers C having been produced by reacting 1 mol polyglycol of the formula $H(OCH_2CH_2)_mOH$, wherein m is 6 to 30 with 1 to 1.4 mol epichlorohydrin is usual manner, said fatty acid amides being reacted in the presence of acid-binding means in a mol ratio 1:1 and finally adjusting the produced reaction product by the addition of acids or bases to a pH value of 3 to 10.

2. Process for producing fatty acid amides containing polyglycol ether residues according to claim 1, in which $R_3$ in the general formula A-H is a branched alkyl residue with 1 to 4 carbon atoms.

3. Process for producing fatty acid amides containing polyglycol ether residues comprising reacting fatty acid amides of the general formula A-H, wherein A is

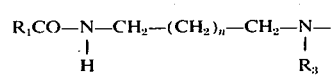

$R_1$ is a saturated or singly unsaturated alkyl residue which can also contain a hydroxyl group with 9 to 17 C-atoms, $R_3$ is $-CH_2CH_2OH$, $-CH_2-CH(OH)CH_3$, $n$ is 0 or 1 with chlorohydrin ethers C, said chlorohydrin ethers C having been produced by reacting 1 mol polyglycol of the formula $H(OCH_2CH_2)_mOH$, wherein m is 4 to 16 with 1 to 1.4 mol epichlorohydrin in usual manner, said fatty acid amides being reacted in the presence of acid-binding means in a mol ratio from 1:1 to 1:2 or in a mol ratio from 1:1.5 to 1:2 and finally adjusting the obtained reaction product by the addition of acids or bases to a pH value of 3 to 10.

4. Process according to claim 3, comprising reacting the said fatty acid amides of the general formula A—H, wherein $R_3$ is $-CH_2CH_2OH$ or $-CH_2-CH(OH)CH_3$ in the presence of acid-binding means with chlorohydrin ethers C, defined as above, in a mol ratio from 1:1.5 to 1:2 and finally adjusting the produced reaction product by the addition of acids or bases to a pH value of 3 to 10.

5. Process according to claim 4, comprising reacting the said fatty acid amides of the general formula A-H, wherein $R_3$ is $-CH_2CH_2OH$ in the presence of acid-binding means with chlorohydrin ethers C, defined as above, in a mol ratio 1:2 and finally adjusting the produced reaction product by the addition of acids or bases to a pH value of 3 to 10.

* * * * *